United States Patent [19]

Collins et al.

[11] 4,349,225
[45] Sep. 14, 1982

[54] SHEET GRIPPING AND HANDLING DEVICE

[76] Inventors: Darryl L. Collins; Donna L. Collins, both of 4631 S. Norfolk Way, Aurora, Colo. 80015; Merton C. Knapp; Evalyn L. Knapp, both of 108 S. Grant, Mt. Ayr, Iowa 50854

[21] Appl. No.: 181,732

[22] Filed: Aug. 26, 1980

[51] Int. Cl.³ ............................................... B66C 1/48
[52] U.S. Cl. ...................................... 294/16; 294/104; 294/164
[58] Field of Search .................... 294/15, 16, 27 R, 28, 294/86 R, 92, 101–104, 113, 114, 137, 164, DIG. 1; 24/134 R, 134 L, 134 P, 244, 248 R, 248 E; 269/231

[56] References Cited

U.S. PATENT DOCUMENTS

| 83,109 | 10/1868 | Thompson | 24/134 P |
|---|---|---|---|
| 399,053 | 3/1889 | Landee | 24/134 L |
| 1,036,626 | 8/1912 | House | 294/104 X |
| 2,250,836 | 7/1941 | Landers | 294/104 |
| 2,322,651 | 6/1943 | MacChesney | 24/134 R |
| 2,549,918 | 4/1951 | Miller | 294/104 |
| 2,568,194 | 9/1951 | Johnson | 294/102 R |
| 2,791,460 | 5/1957 | McLeod | 294/104 X |
| 3,239,263 | 3/1966 | Farmer et al. | 294/114 X |
| 3,253,849 | 5/1966 | Hansen | 294/16 |

Primary Examiner—Johnny D. Cherry
Attorney, Agent, or Firm—Thomas M. Scofield

[57] ABSTRACT

Improvements in sheet gripping and handling devices; devices for gripping the vertical end edges of heavy, rigid sheet materials to facilitate and permit carrying thereof supported by the devices; handle devices engageable with the vertical end edges of heavy, rigid sheet material like sheet rock, enabling two men to comfortably and safely carry one or more sheets between them.

18 Claims, 8 Drawing Figures

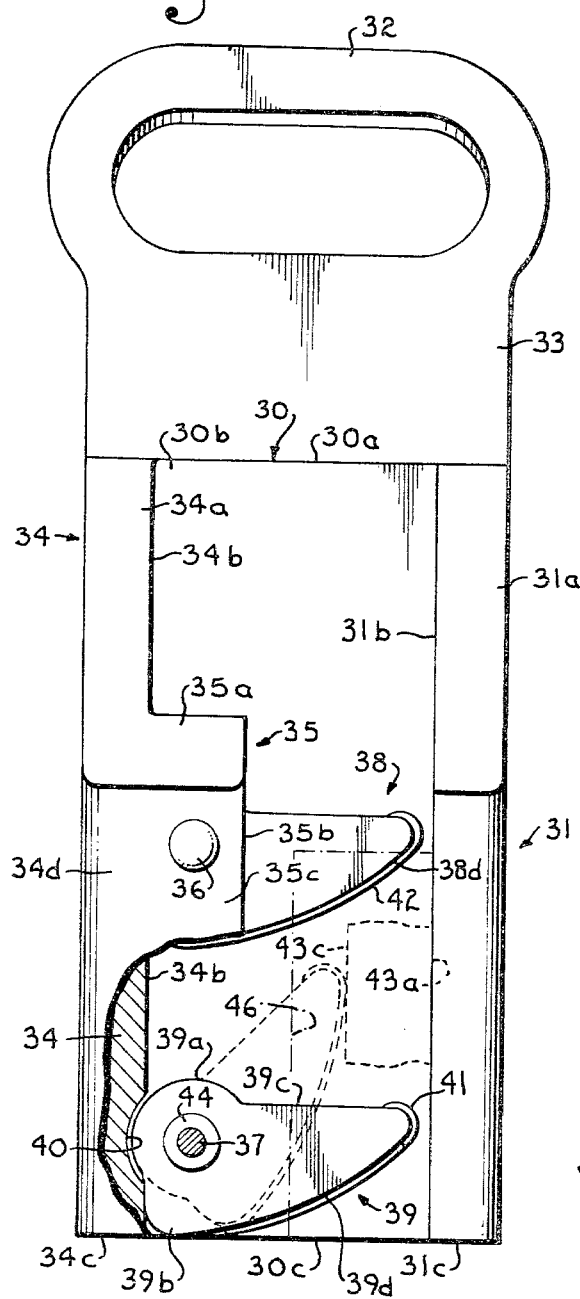
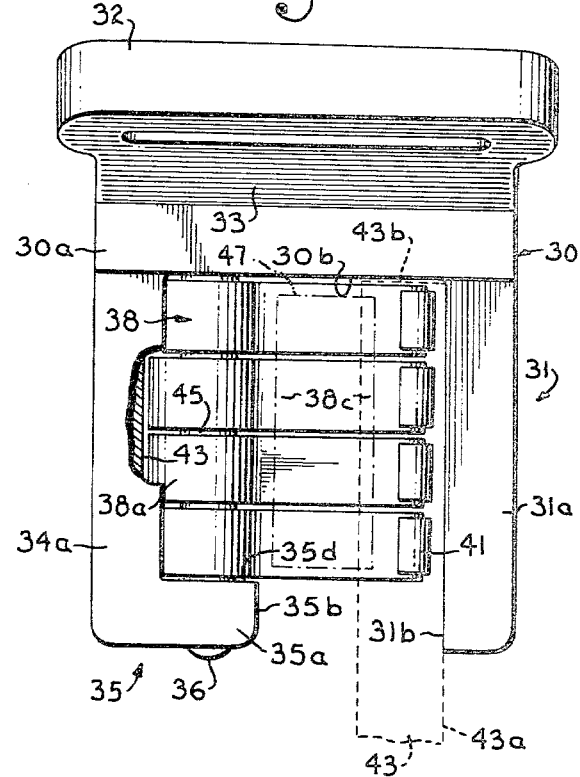
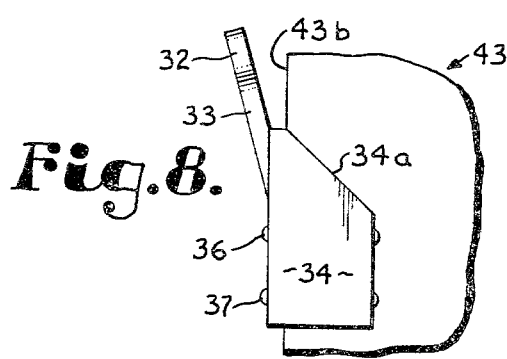
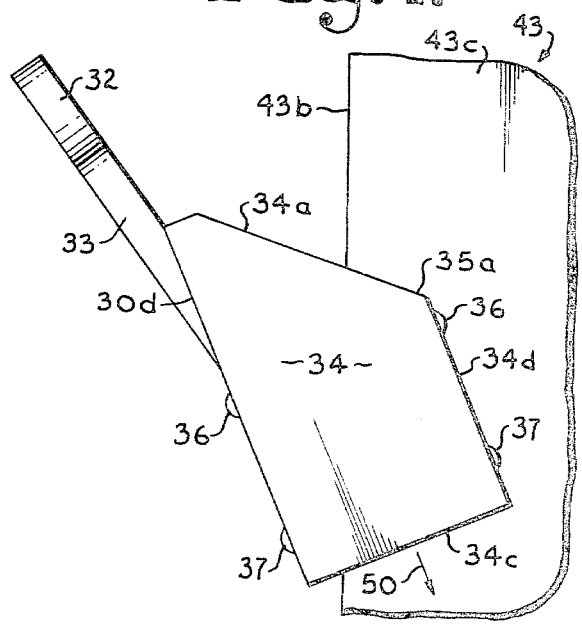

SHEET GRIPPING AND HANDLING DEVICE

BACKGROUND OF THE INVENTION

In the construction industry, it is necessary for workmen to transport rigid sheet construction materials such as wallboard, sheet rock and plywood from piled storage or vehicular transport to the areas of construction. Not only are these sheet materials heavy and cumbersome, they are also vulnerable to damage, and, to a certain extent, dangerous in handling. Typical or standard sizes for wall-wallboard and plywood may be in the range of four by eight feet or more.

A number of prior art devices have been provided for handling, clamping and manipulating large flat objects including plywood, fiberboard, gypsum board and the like. Even with such devices, the handling of such panels has proved to be difficult and hazardous even for two or more people, because of the necessity of simultaneously grasping the panels by the workmen, lifting, balancing the sheets in the vertical carrying position and the moving of them to the necessary construction point.

Of particular importance is the problem should one of the workers carrying the sheet material stumble, fall or temporarily have to stop. Unforeseeable, unusual circumstances encountered in transporting heavy sheet materials through buildings, up stairs or inclines, around obstacles and the like all present risk and hazard to the workers, particularly because of their vulnerability in carrying the heavy weight and being linked to the cumbersome object. Therefore, it is most desirable that the devices for engaging the sheets operate to put the entire bodies of the workmen out from under and somewhat away from the materials being carried. Additionally, the engagement of the carrying device with the sheet material should be such that shifting the angle of the sheet or the like will not disengage it from the sheet or let the sheet slip from the engagement.

THE PRIOR ART

The prior art discloses numerous devices for handling sheet materials, including the following.

McCurry U.S. Pat. No. 2,793,065 "Handling Device For Sheet Material", issued May 21, 1957.

Scarlett U.S. Pat. No. 3,000,662 "Sheet Grip", issued Sept. 19, 1961.

Docken U.S. Pat. No. 3,116,084 "Sheet Material Handling Device" issued Dec. 31, 1963.

Lebre U.S. Pat. No. 3,150,895 "Handling Gripper . . . ", issued Sept. 29, 1964.

Hansen U.S. Pat. No. 3,253,849 "Sheet Handling Implement", issued May 31, 1966.

Wesemann U.S. Pat. No. 3,363,927 "Device For Carrying Panels", issued Jan. 16, 1968.

Reynolds U.S. Pat. No. 3,374,024 "Handling Device", issued Mar. 19, 1968.

Ilich U.S. Pat. No. 3,524,670 "Sheet Metal Carrier", issued Aug. 18, 1970.

Russo U.S. Pat. No. 4,013,202 "Device For . . . Lifting . . . Sheet . . . ", issued Mar. 22, 1977.

BRIEF DESCRIPTION OF THE INVENTION

The subject improvements are directed to handled devices for engaging the end edges of a vertically positioned panel or board of heavy sheet material. Each device is used in pairs, one man on each end of the panel or panels to be carried. The sheet or panel is carried with the long side of the rectangular sheet parallel or horizontal and the short sides vertical. The devices are gripped on the vertical end edges of the sheet.

A first one of the devices involves a basic frame having a backing block thereon against which there works an off-centered cylindrical cam on a pivot shaft. That is, as the vertical edge of the panel to be carried is inserted between the off-centered cylindrical cam or roller and the backing block, initial edge engagement is made. The device itself is actually fitted downwardly over the end edge of the sheet, thus operating to rotate the roller or cam away from the backing wall or block.

To lock the sheet onto the grip, the handle is merely pulled upwardly- rotating the off-center cylindrical cam around the pivot to grip against the outer face of the sheet, the other face of the sheet being pushed against the backing block on the frame. A friction surface is provided on the cam or roller. A stop block for the cam is also mounted to prevent overshooting and release. The cam may be spring loaded to or toward actual position.

A second form of the device involves a U-shaped frame carried by a handle on the base of the U. One leg of the U operates as a backing sheet or block, there being provided on the opposite wall a multiplicity of elongate, pivoted, engaging fingers analogous in form to commas. Two sets of the engaging fingers are mounted with respect to the wall opposed to the backing sheet or block.

In operation of the second form, the end edges of the sheet are engaged by pushing the device downwardly and then lifting upwardly on the handle to engage the fingers against one face of the panel or sheet to be carried. This action rams the other face against the backing block. Nonskid or friction surfaces may be provided on the fingers and the backing block.

OBJECTS OF THE INVENTION

The first object of the invention is to provide improved devices to handle and carry heavy, large, rigid sheet materials such as plywood, wallboard, glass, sheet rock and the like.

Another object of the invention is to provide such large, rigid sheet handling means which engage the end edges of the sheet and are so used by the workers as to clear the workers and carriers from the sheet itself as it is handled and carried, so as to minimize hazard.

Another object of the invention is to provide simple, rugged, safe, long-lived sheet gripping and handling devices which are relatively cheap and simple to manufacture and wherein all of the parts thereof are readily visible for inspection as to condition, as well as availability for replacement or repair.

Another object of the invention is to provide improved sheet gripping devices wherein the weight of the sheet material being carried operates to maintain secure engagement with the carrying devices once the initial engagement is made.

Another object of the invention is to provide such sheet gripping and carrying devices which may be readily and effectively engaged with and disengaged from the sheet material to be carried and handled.

Another object of the invention is to provide such heavy, rigid sheet handling and carrying devices wherein the sheets are carried in vertical edge position, thus minimizing hazard to the material, particularly bending and breaking thereof.

Another object of the invention is to provide such sheet engagement and handling devices which provide effective engagement of the sheet material which yet minimizes damage thereto.

Another object of the invention is to provide such sheet engaging devices wherein the engagement of the device with the sheet and the manner thereof is always readily visible to the worker using same.

Another object of the invention is to provide such sheet gripping and handling devices wherein a change of angle of the sheet being handled, once engaged, will not weaken or lessen the engagement so long as the weight is being carried by the subject device.

Another object of the invention is to provide devices of the character described which are adapted to engage, hold, carry and handle flat panels of a variety of materials and thicknesses, all with equal effectiveness and safety.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIGS. 1-4, inclusive show a preferred form of the invention utilizing a rotatable off-center cam engagement form of device.

FIGS. 5-8, inclusive show the second modification or form of the sheet grasping and handling device utilizing, in place of the off-center rotatable cam in the previous figures, two sets of individually pivotable fingers.

Figure 2:
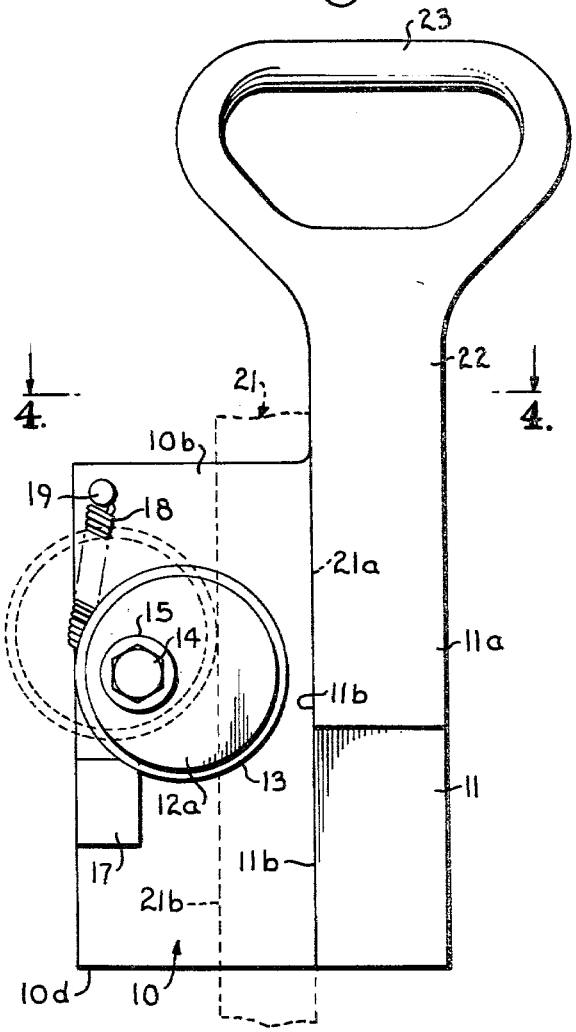
FIG. 2 is an end view of the off-center cam type device looking into the end of the device into which the work is inserted, the full line showing illustrating the off-center cam before engagement with the sheet and the dotted line showing indicating the position of the off-center cam after the engagement.
Figure 3:
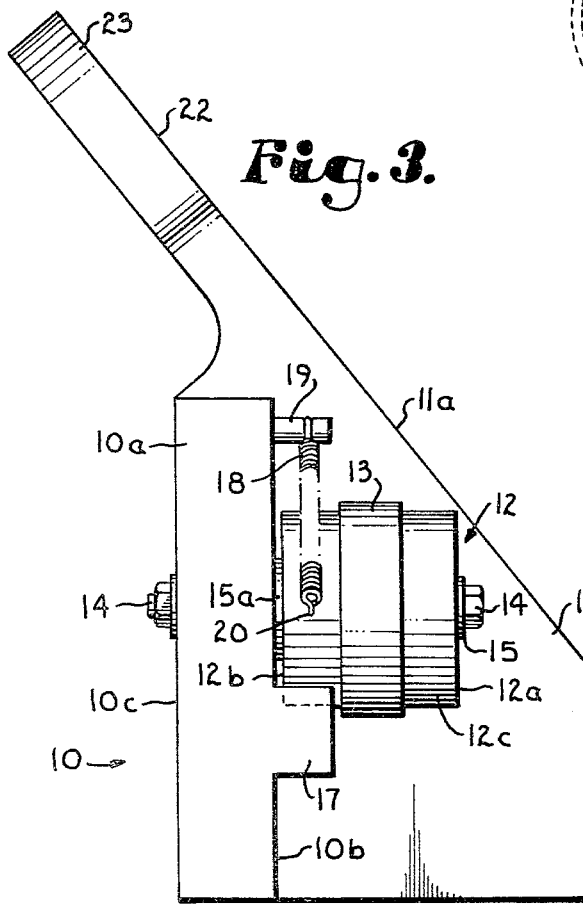
FIG. 3 is a side elevation of the device of FIG. 2 taken from the left of the view of FIG. 2 looking to the right in the view.
Figure 4:
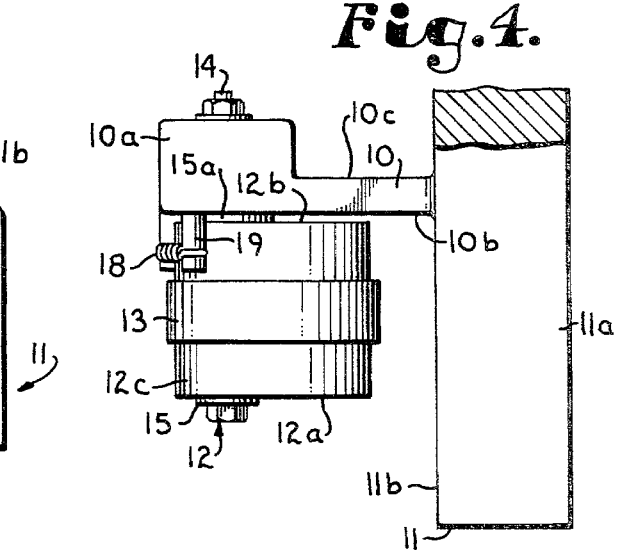
FIG. 4 is a view taken along the line 4—4 of FIG. 2 in the direction of the arrows.

FIG. 5 is a front elevational or end view of the second form of the device analogous to the view of FIG. 2, the full line showing illustrating the gripping fingers of the device before insertion of a sheet to be gripped therein and, in the dotted lines, of the lower set of fingers, the gripping and engaging position.

FIG. 6 is a top view of the device of FIG. 5.

FIG. 7 is a side elevation of the device of FIGS. 5 and 6 in the process of engaging the end edge of a panel or sheet to be carried and handled, the view taken from the left hand side of FIG. 5 looking to the right in that view.

FIG. 8 is a view like that of FIG. 7, but showing the device fully engaged on the edge of the sheet or panel to be carried.

FIGS. 1-4, INCLUSIVE

The sheet or panel vertical edge engaging device of these figures involves a basic frame having a backing block or wall thereon against which there works an off-center, cylindrical cam on a pivot shaft. The frame also includes a grasping handle which extends substantially forwardly (or rearwardly) of the sheet being engaged, thus clearing, insofar as practically possible, the workers using the device from the heavy sheet. Additionally, the frame has an end wall against which the vertical end edge of the sheet or panel abuts, so that the sheet cannot move through the gripping device should one worker stop or change pace of the pair.

To operate the device, the vertical end edge of the panel or sheet is inserted between the cylindrical cam or roller and the backing wall for initial edge engagement therebetween. To lock the sheet or panel into the grip, the handle is merely pulled upwardly, rotating the off-center cylindrical cam or roller around its pivot to grip it against one outer face of the sheet, the other face being pushed against the backing wall or block on the frame. A friction surface is provided on the outer face of the cam and may be provided on the backing wall.

A stop block for the cam is provided to prevent overshooting thereof and release of the sheet due to its own weight. The cam is preferably spring loaded to or toward normally actuated position to facilitate engagement.

Referring, then, to FIGS. 1-4, the frame of this form of the device is made up of an end wall 10 which has thickened portion 10a on one side. Connected to the opposite edge of end wall 10 is first or backing wall 11. The upper face or edge 11a of backing wall 11 may be angled as seen in the views upwardly and rearwardly of end wall 10 to form the base 22 of loop handle 23. The inboard face 11b of block or wall 11 may be roughened or surfaced with frictional material to give an engaging surface. This is generally not necessary in the case of a metal or wood wall 11. Walls 10 and 11 extend normal to one another.

Cylindrical cam 12, generally designated, has outboard end 12a, inboard end 12b and cylindrical working periphery or face 12c. A band of frictional material such as rubber or plastic 13 is fixed to the cylindrical side face 12c of cam 12. Bolt or shaft 14 pivotally mounts cam 12 off-center on wall 10, through enlarged portion 10a, with outboard and inboard washers 15 and 15a permitting ready rotation of cam 12 around post, shaft or bolt 14. The off-center mounting provides the larger portion of cylindrical cam 12 inboard, towards first wall 11. A nut locks shaft 14 removably through cam 12 and wall portion 10a in such manner that cam 12 is rotatable on shaft 14.

A stop 17 is provided, on the face 10b of end wall 10 carrying cam 12, on the opposite side of shaft 14 from handle 23, that is, below the pivotal shaft 14 when handle 23 is up as seen in the various figures. Stop 17 limits the downward pivot of cam 12 around shaft 14 slightly past or near or at top dead center of the cam with respect to the pivot. Preferred is the slightly over top dead center arrangement seen in the views. Stop 17 preferably terminates inboard of friction band 13. Said otherwise, stop 17 limits clockwise pivot of cam 12 around shaft 14 as seen in FIG. 2.

Means are provided to normally bias the cam 12 toward, at or slightly over top dead center (position of FIG. 2 shown in full lines) against stop 17. Such means specifically are here shown as a resilient spring 18 connected at its upper end to pin or shaft 19 fixed to face 10b of end wall 10 and at its lower end at 20 to the face of the cam or a pin thereon. Upper pin 19 must be positioned high enough to permit the cam 12 to pivot thereunder as seen in dotted lines in FIG. 2.

Figure 1:
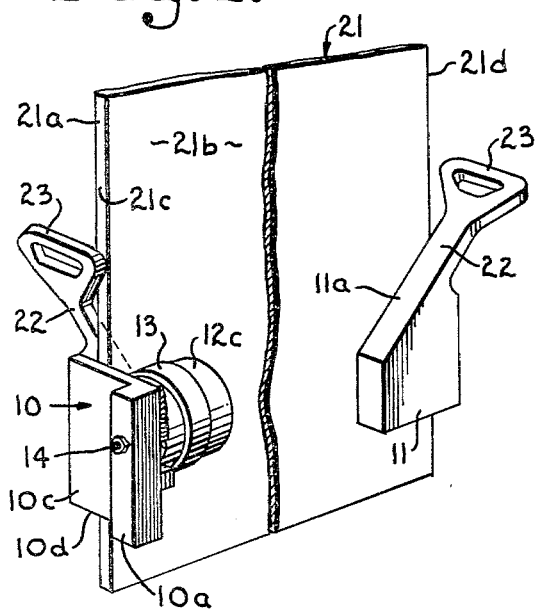
FIG. 1 is a three-quarter perspective view from above of a heavy, rigid panel of material such as sheet rock showing, at the left hand edge, the sheet gripped by one such device with the cam member in view and, on the right hand side of the view, the sheet gripped by the device with the other side of the device in view.

A workpiece such as a plywood panel, sheetrock board, wall board, fiberboard or gypsum board or the like is seen at 21 in FIGS. 1 and 2, the latter in dotted lines. Work panel 21 has side faces 21a and 21b and end edges 21c and 21d. For descriptive purposes, it is assumed that the gripping device seen at the left in FIG. 1 is the same device as illustrated in FIG. 2. Thus it can be seen that (dotted lines of FIG. 2) face 21b of panel 21 is gripped by band 13 of cam 12, while the other face thereof, 21a, is forced against wall side or face 11b of first wall 11 in engagement.

Thus it is seen that FIGS. 1-4, inclusive show a device for gripping the straight, vertically positioned end edge of a rigid, substantially rectangular sheet or panel 21. The device comprises a first wall 11 operative to abut against and frictionally engage one side face 21a of sheet 21. End wall 10 face 10b is operative to abut against the sheet end edge 21c. The first and end walls 11 and 10 are connected at right angles to one another. An off-center, cylindrical cam 12 is pivotally mounted on face 10b of end wall 10 at substantial right angles thereto, spaced away from first wall 11. Cam 12 is adapted to frictionally engage the other side face 21b of sheet 21. Cam 12 is pivotable from a position away from first wall 11 (dotted line showing in FIG. 2) to a position closer thereto (full line position of FIG. 2) to engage, in cooperation therewith, both side faces of sheet 21 therebetween. Handle 23 is connected to one of the first and end walls 11 and 10, here end wall 11, and extends past the side 10c of end wall 10 away from cam 12 and first wall 11.

Stop means 17 are provided on face 10b of end wall 10 below cam 12, limiting the pivot of the latter downwardly over top dead center relatively to first wall 11. Resilient means 18 are provided normally biasing cam 12 downwardly against stop means 17. Handle grip 23 preferably extends substantially horizontally when the engaged sheet 21 is vertical, handle 23 also being positioned substantial normal to first wall 11. Frictional engaging means 13 are preferably provided on cam 12 and may be provided, if necessary, (not shown) on face 11b of wall 11.

In operation, as previously described, the sheet or sheets to be engaged are stood vertically on one end by the two workers, each having a device of the character described. With one hand of each worker or at least one worker steadying the panel(s) in vertical position, with the other hand, each worker applies the device against an end edge 21c or 21d of panel 21, with the lower edge 10d first contacting the end edges of the sheet to be lifted and the cam 12 and wall 11 only slightly angled from the horizontal. As the edge of the sheet strikes the cam, the cam is pivoted from the full line position of FIG. 2 to the dotted line position thereof. The worker continues to push the frame towards the end edge of the sheet, pushing downwardly on handle 23 so that wall 10 moves to a vertical position and abuts against the end edge 21c or 21d of the sheet. Once this happens, with the entire end edge of the sheet in contact with face 10b of wall 10 next to first wall 11, all that is necessary to provide full engagement is for the operator to pull upwardly on the handle, thus engaging frictional band 13 against one side face of the panel (locking the cam at a certain pivot position on shaft 14).

Each worker does this, comfortably engaging the device at the level at which the particular worker can lift most comfortably. A powerful wedging action occurs immediately and, as the full weight of the sheet falls against the cams the sheet is firmly seized by both gripping devices and may be lifted off the ground and transported.

To disengage the grasping devices from the sheet, once the preferred location is reached, the sheet is set down on its end edge and each operator merely pushes down on the handle, thus permitting the off-center cam to rotate in a counterclockwise direction in the view of FIG. 2 to disengage the sheet end edge engagement. At that point the worksheet may be leaned against a supporting surface, laid flat, directly applied to the construction or the like.

When the device is initially applied to the end edge and end side faces of a worksheet, the insertion over the edge is against the action of relatively powerful spring 18. This requires a firm effort on the part of the worker. The strength of the spring is sufficient that it drives the off-center cam immediately against the side face of the worksheet and the other face of the work sheet against first wall 11 in a powerful fashion. Thus there is a minimum slippage and direct engagement of the device with the work, upon the user or worker pulling strongly upwardly on the handle to make a carrying engagement.

FIGS. 5-8, INCLUSIVE

The gripping devices in the two sets of figures (1-4, inclusive and 5-7, inclusive) may be characterized as devices for gripping the straight, vertically positioned, end edges of a rigid, substantially rectangular sheet or panel. Both specific devices shown include a first wall operative to abut against and frictionally engage one side face of the sheet, an end wall operative to abut against the sheet end edge and means pivotally mounted on the end wall, extending outwardly therefrom and substantially normal thereto, as well as in opposition to the first wall, sheet. In both cases the first and end walls are connected at right angles to one another. The pivotally mounted means are pivotable from a position relatively away from the first wall to a position closer thereto to frictionally and compressibly engage, in cooperation therewith, both side faces of the sheet therebetween. Each device has a handle connected to one of the first and end walls extending past the side of the end wall away from the pivotally mounted means and the first wall.

In the device of FIGS. 1-4, inclusive, the pivotally mounted means comprises an off-center, cylindrical cam pivotally mounted on the end wall at substantial right angles thereto and spaced away from the first wall, adapted to frictionally engage the other side face of the sheet. In the device of FIGS. 5-8, inclusive, the pivotally mounted means includes at least one row of individually pivoted fingers, that row pivotally mounted on the end wall, extending outwardly substantially normal thereto and in opposition to the first wall with the free ends of the fingers. The device actually illustrated shows and employs two rows of pivotally mounted fingers, the rows vertically spaced one from the other in their mountings on the end wall.

Referring, then, to FIGS. 5-8, inclusive, there is first provided an end wall generally designated 30 having an upper edge 30a, a sheet edge abutting face 30b, a lower edge 30c and a rear face 30d.

First wall 31 has sloped upper edge 31a, worksheet abutting face 31b and lower edge 31c. A loop handle 32 has downwardly extending, inwardly slanted base 33 which connects into or may be integral with the rear upper portion 30d of end wall 30.

A second wall generally designated 34 has upper inclined edge 34a, inboard face 34b and lower edge 34c. The outboard edge 34d of second wall 34 has flange 35 (generally designated) fixed normal thereto thereon which extends parallel to end wall 30 and also at right angles to first wall 31. Flange 35 has inclined upper wall or face 35a, free inboard edge 35b, outboard face 35c and inboard face (FIG. 6) 35d. A pair of elongate pins or shafts 36 (upper) and 37 (lower) extend between and are fixed to wall 30 and flange 35, vertically spaced apart from one another.

Two sets of pivotally mounted fingers, in two parallel rows, are received, respectively, on shafts 36 and 37, with the free ends of the fingers extending toward first wall 31 and the bases of the fingers closely adjacent second wall 34. Each of the fingers illustrated is identical in structure to the other fingers and thus will be but once described. The upper fingers, four in number as is seen in FIG. 6, are generally designated 38, while the lower figures are generally designated 39.

Referring to the lower part of FIG. 5 and the one finger 39 shown therein, reference is first made to the indentation 40 of arcuate shape seen in face 34b of second wall 34. Pivotally movable therewithin without contact is uniform outer diameter, partially circular portion 39a of finger 39. Below this, on the inboard or left hand portion of finger 39 in the view of FIG. 5 is limiting extension 39b which limits clockwise rotation of finger 39 around pivot 37. Counterclockwise rotation, as may be seen in the dotted line showing of FIG. 5, is limited only by the upper face or wall 39c abutting face 34b of wall 34. The end and lower outboard surface 39d of finger 39 has frictional engaging band 41 of rubber or like material glued or otherwise fixedly attached thereto.

Referring to the upper set of fingers 38 in FIG. 5 and FIG. 6, parts 38a, 38c, 38d and 42 with respect to fingers 38 correspond to parts 39a, 39c, 39d and 41 of fingers 39. The structure of fingers 38, thus, is the same in all respects to the structure of fingers 39. Recess 43 (FIG. 6) in face 34b of wall 34 is like and equivalent to recess 40 in the same wall face, but higher. Washers 44 (FIG. 5 on shaft 37) and 45 (FIG. 6 on shaft 36) serve to space fingers 39 and 38 from like fingers on the same shaft and permit the free individual pivotal movement of each finger on its fixed shaft. Said otherwise, each finger 38 is free to pivot on shaft 36 independent of each other finger 38, the same being true for each finger 39 on shaft 37.

Coil springs encircling shaft 36 and 37 and connected to individual fingers (not shown) or compression springs communicating between wall 34 and fingers 38 and 39 (also not shown) may be employed to bias fingers 38 and 39 in a clockwise direction in the view of FIG. 5 (analogous to the bias of cam 12 in a clockwise direction in FIG. 2), if desired. However, such springs (which also may be coil springs connecting the undersides of fingers to wall 34) are not necssary for operability.

Thus, the device of FIGS. 5–8, inclusive has first wall 31 operative to abut against and frictionally engage one side face of a worksheet generally designated 43 in the views, the face shown being 43a. End wall 30 is operative to abut against the sheet end edge 43b. First and end walls 31 and 30 are connected at right angles to one another. At least one shaft 36 is connected at one end thereof to end wall 30, extends normal thereto, as well as in parallel and spaced apart relationship with respect to first wall 31. A plurality of elongate fingers 38 are each pivotally mounted adjacent one end thereof on shaft 36, the free ends of the fingers extending toward first wall 31. Fingers 38 are pivotable from a position with their free ends relatively away from first wall 31 to a position closer thereto in order to frictionally compressibly engage, in cooperation with end wall 31, both side faces of sheet 43 therebetween while the end edge 43b of the sheet abuts end wall 30. Means like 39b are provided limiting the pivotal motion of fingers 38 over top dead center of their pivots past a substantially normal position with respect to first wall 31. Handle 32 is connected by its base 33 to one of the first and end walls, here shown as both, the handle and its base extending past the side of the end wall 30 away from fingers 38 and first wall 31.

A second shaft 37 is preferably employed connected at one end thereof to end wall 30 in the manner of shaft 36, also extending normal to end wall 30 and parallel to and in spaced apart relationship to first wall 31. Second shaft 37 is vertically spaced apart on end wall 30 from first shaft 36 and has a second plurality of like elongate fingers 39 thereon adapted to engage, in cooperation with first wall 31 and the other set of fingers 38, both side faces of sheet 43 therebetween frictionally and compressibly. Thus, in the device shown, the sheet is engaged on face 43a thereof by first wall 31 and on face 43c thereof by the two sets of fingers 38 and 39 at two vertical levels.

Shaft 36 and 37 preferably are received in their outboard ends in a flange 35 which is mounted with respect to end wall 30 by second wall 34. Wall 34 is mounted parallel to and spaced in opposition with first wall 31. The handle grip 32 preferably extends substantially horizontally and normal to the first and second walls, as well as parallel to the end wall. Frictional engaging means 41 and 42 are provided on the ends and underside portions of fingers 38 and 39. The inboard face 31b of first wall 31 may have frictional means such as a rubber sheet or a roughened surface to facilitate engagement with face 43a of the worksheet. However, this is not generally necessary. Resilient biasing means may be provided normally driving or forcing fingers 38 and 39 to the full line position at, near or slightly over top dead center and against their limiting bosses as seen at 39b.

In operation, the device of FIGS. 5–8, inclusive operates like the device of FIGS. 1–4, inclusive. That is, the operators angle the engaging devices from vertical so that bottom portion 30c of end wall 30 first engages the side edge of the sheet. This is best seen in FIG. 7, which view could serve as a model for the initial engagement of the device in FIGS. 1–4, inclusive. That is, as the device is shoved against the edge 43b of worksheet 43, downwardly and to the right in the view of FIG. 7, the outer lower fingers 39 are first moved from the full line position of FIG. 5 to the dotted line position thereof, moving inwardly in the row. The same then takes place with respect to the outboard, then the inboard, fingers of row 38. Once all of the fingers 39 and 38 are fully deflected and lying against face 43c of panel 43 and edge 43b is fully in contact with wall 30 face 30b, then the operator pulls upwardly on handle 32, thus completing and consummating a full eight finger engagement (in the structure shown with two sets of four fingers) as seen in FIG. 8. The panel then may be handled and lifted and moved as desired on the job. Once at the desired location, the operators set the sheet down on its lower edge, still vertical.

To disengage the device, the operators push downwardly on handles 32 and pull the devices outwardly so the end walls are pulled away from the end edges at edge 43b of the sheet. At the downward shove, the fingers move counterclockwise in FIG. 5 to free the friction and compression engagement.

Two variations are illustrated in FIGS. 5 and 6. The first of them, in FIG. 6, involves an optional strip of rigid or flexible materials 47 glued or otherwise secured to the top surfaces of the upper level of the fingers 38. Such may be somewhat flexible or absolutely rigid. When such is secured to the tops of said fingers, then the group of fingers acts as a unit. Alternatively, such connecting member as at 47 may be employed also or alone on the top of fingers 39 (not seen).

In a further variation, a passage or opening 46 may be provided through wall 30 next to flange 31 and extending upwardly from the lower edge 30c of wall 30. In this manner, this device may additionally be employed to lift sheets, including glass, from the top edges thereof. Yet alternatively, when used on the end edges of sheets as seen in FIG. 7, the presence of such an opening or passage 46 will permit deeper engagement of the lower portion of the device with the end edge for upstairs carrying or angle carrying and the like.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A device for gripping and lifting the straight, vertically positioned edge of a rigid, substantially rectangular sheet or panel which is being held in substantially vertical orientation, with two substantially parallel side edges thereof in substantially horizontal position and two substantially parallel end edges thereof in substantially vertical position, comprising, in combination:
    a first, normally vertical wall operative to abut against and frictionally engage a first zone of one side face of the panel adjacent one end edge thereof,
    a normally substantially vertical end wall operative to abut against said one of the said sheet end edges,
    the first and end walls connected at right angles to one another to form an L shaped structures in plan view with the inboard faces of said walls being next to one another and said walls having upper and lower ends thereto,
    an off-center, cylindrical cam pivotally mounted on a shaft carried by the said end wall at substantial right angles thereto and spaced away from said first wall adapted to substantially non-penetratingly, frictionally engage a second zone of the other side face of said panel also adjacent said end edge in opposition to said first wall engagement,
    said cam pivotable around its axis from a position upwardly spaced away from said first wall downwardly to a position spaced closer thereto to engage, in cooperation therewith, the first and second zones of said side faces of the panel therebetween,
    stop means on the end wall below the cam limiting its pivot downwardly over top dead center relative to said first wall in a position where the cam is substantially in its closest possible approach to said first wall,
    resilient means on said device normally biasing the cam downwardly around its pivot against the said stop means, and
    a rigid loop handle rigidly and closely connected at its lower end to one of the upper inboard end of the first wall and an upper portion of the end wall, the top portion of said handle normally horizontal in operating position and spaced backwardly of the plane of the end wall outer face, whereby to clear the hand of the user gripping the handle from the end edge of the panel gripped, yet provide a horizontal, positive grip closely adjacent the engagement and the end edge of the panel or sheet.

2. A device as in claim 1 wherein the lower edges of the first and end walls are in line with one another and horizontal when the walls are vertical.

3. A device as in claim 1 wherein the handle is connected to an upward and rearward extension of the first wall.

4. A device for gripping a straight, vertically positioned end edge of a rigid, substantially rectangular sheet or panel which is being held substantially vertical orientation, with two substantially parallel side edges in substantially horizontal position and two substantially parallel end edges thereof in substantially vertical position, comprising, in combination:
    a first, normally vertical side wall operative to abut against and frictionally engage a first zone of one side face of the panel adjacent one first end edge thereof,
    a second, normally substantially vertical end wall operative to abut against said first panel end edge,
    the first and second walls connected together at right angles to one another to form an L shaped structure in plan view with the inboard faces of said walls being next to one another and said walls having upper and lower ends,
    a shaft connected to said second wall and extending at right angles thereto parallel to the first wall, said shaft spaced away from said first wall a distance greater than the thickness of any sheet or panel to be gripped by the device,
    asymmetrical dog means pivotably mounted on said shaft and extending at least in part at all times into the space between the shaft and the inboard face of the first wall,
    said dog means pivotable from a first position with an inner engaging portion thereof positioned relatively most closely adjacent said first wall inboard face, and relatively lower in said space, upwardly to a second position with said inner portion thereof positioned relatively further away from said first wall inboard face, and relatively higher in said space, the said dog means normally biased to said first position at least when said first and second walls are substantially vertically oriented and having the lower and outer face of the inner engaging portion thereof arcuate in form and having substantial non-penetrating, frictional engaging means thereon, first control means on said device operative to prevent rotation of said dog means downwardly past said first position, second control means on said device operative to limit rotation of said dog means upwardly away from said first position in order that the inner engaging portion of said dog means will tend to largely remain in the space between the shaft and first wall and in any case not reverse over top dead center out of said space, and a rigid loop handle rigidly and closely connected at its lower end to one of the upper inboard end of the first wall and an upper portion of the second end wall, the top portion of said handle normally horizontal in operative position, with the first and second walls in substantially vertical orientation, and said handle top portion spaced backwardly free of the plane of the outboard face of the second end wall, whereby to clear the hand of the user gripping the handle from the end edge of the panel gripped, yet provide a horizontal, positive grip closely adjacent the engagement and the end edge of the panel or sheet.

5. A device as in claim 4 wherein said handle is connected to said end wall and comprises a rearwardly slanted, upper extension thereof.

6. A device as in claim 4 wherein the rigid loop handle is connected to and extends substantially normal to a rearward and upward extension of the first side wall.

7. A device as in claim 4 wherein said dog means comprises at least one elongate finger means and the first and second control means comprise upward and downward extensions of a third side wall connected at its inboard end to the second end wall and extending outwardly normal thereto on the other side of said shaft from said first side wall with respect to said shaft.

8. A device as in claim 7 wherein the outboard end of the third side wall has an inward, normal extension thereon directed toward said first side wall, said extension receiving and fixing the position of the outboard end of said shaft.

9. A device as in claim 4 wherein said dog means comprises an off-center, cylindrical cam pivotably mounted on said shaft, said cam pivotable around its axis between said two positions, the second control means comprising resilient means connected between said second end wall and a portion of said cam normally biasing the cam inwardly of said space, the first control means comprising a stop fixed to the second end wall and extending outwardly normal thereto below said shaft limiting the downward pivot of said cam.

10. A device as in claim 4 wherein the first control means is attached to said second end wall below said shaft and adjacent thereto, the second control means being attached to the second end wall above said shaft and adjacent thereto.

11. A device as in claim 4 including an elongate slot in said second end wall next to the inboard face of the first side wall extending upwardly from the lower end edge of said second end wall whereby to permit the upper horizontal edge of the sheet or panel to extend thereinto.

12. A device for gripping the straight, vertically positioned end edge of a rigid, substantially rectangular sheet or panel which is being held in substantially vertical orientation with two substantially parallel side edges thereof in substantially horizontal position and two substantially parallel end edges thereof in substantially vertical position comprising, in combination:

a first, normally vertical side wall operative to abut against and frictionally engage a first zone of one side face of the panel adjacent one first end edge thereof, a second, normally substantially vertical end wall operative to abut against said first panel end edge, the first and second walls connected together at right angles to one another to form an L shaped structure in plan view with the inboard faces of said walls being next to one another and said wall having upper and lower ends, a third, normally substantially vertical side wall also connected to said second end wall and extending normal thereto, said third wall positioned substantially parallel to yet spaced away from said first side wall, whereby the three walls form a U-shaped structure in plan view with the inboard faces of said walls being next to one another and facing one another and said wall having having upper and lower ends, said three walls having substantially in line and normally substantially horizontal lower end edges, whereby to enable the device to rest thereon on a substantially horizontal surface with the said three walls substantially in vertical orientation, an extension on the free end of the third wall away from the second wall substantially normal to the third wall, said extension directed toward the first wall and substantially normal thereto also, the third wall and the extension thereon both spaced away from said first wall a distance greater than the thickness of any sheet or panel to be gripped by the device, a normally horizontal shaft extending between the second end wall and third wall extension and connected at its ends thereto, said shaft spaced away from the third wall and positioned above the lower edges of the three walls, dog means having a free end inner engaging portion thereof pivotably mounted by a base portion thereof on such shaft and extending at least in part at all times into the space between the shaft and the inboard face of the first wall, said dog means pivotable from a first position with said inner engaging portion thereof positioned relatively most closely adjacent said first wall inboard face, and relatively lower in said space, upwardly to a second position with said portion thereof positioned relatively further away from said first wall inboard face, and higher in said space, the said dog means normally biased to said first position at least when said first and second walls are substantially vertically oriented and having the lower and outer face of the inner engaging portion thereof arcuate in form with non-penetrating, frictional engaging means thereon, first control means on said device operative to prevent rotation of said dog means downwardly past said first position over top dead center of said pivot, second control means on said device operative to limit rotation of said dog means upwardly away from said first position in order that said dog means will tend to largely remain in the space between the shaft and first wall and in any case not reverse over top dead center out of said space, and will normally be biased toward said first position, and a rigid loop handle rigidly and closely connected at its lower end to the upper portion of the second end wall, the top portion of said handle normally horizontal in operating position with the first and second walls substantially in vertical orientation and said handle top portion spaced backwardly free of the plane of the outboard face of the second end wall, whereby to clear the hand of the user gripping the handle from the end edge of the panel gripped, yet provide a horizontal, positive grip closely adjacent the engagement and the end edge of the panel or sheet.

13. A device as in claim 12 wherein the first and second control means include said third wall extending both above and below said shaft, there being stop means on said dog means adapted to abut against the inboard face of said third wall below said shaft to limit downward rotation of the dog means over top dead center of the pivot.

14. A device as in claim 12 wherein said shaft is positioned relatively closely adjacent the lower end edges of said walls and all of said walls extend substantially above said shaft.

15. A device as in claim 12 including an elongate slot in said second end wall next to the inboard face of the first side wall extending upwardly from the lower end edge of said second end wall whereby to permit the upper horizontal edge of the sheet or panel to extend thereinto.

16. A device as in claim 12 wherein said dog means comprises a plurality of individually pivotable fingers.

17. A device as in claim 12 wherein said dog means comprises a plurality of individual fingers joined for pivotal motion together.

18. A device as in claim 12 including a pair of shafts extending between said second end wall and said third wall extension, said shafts vertically spaced from one another and dog means pivotably mounted on each said shaft.

* * * * *